Patented Nov. 15, 1949

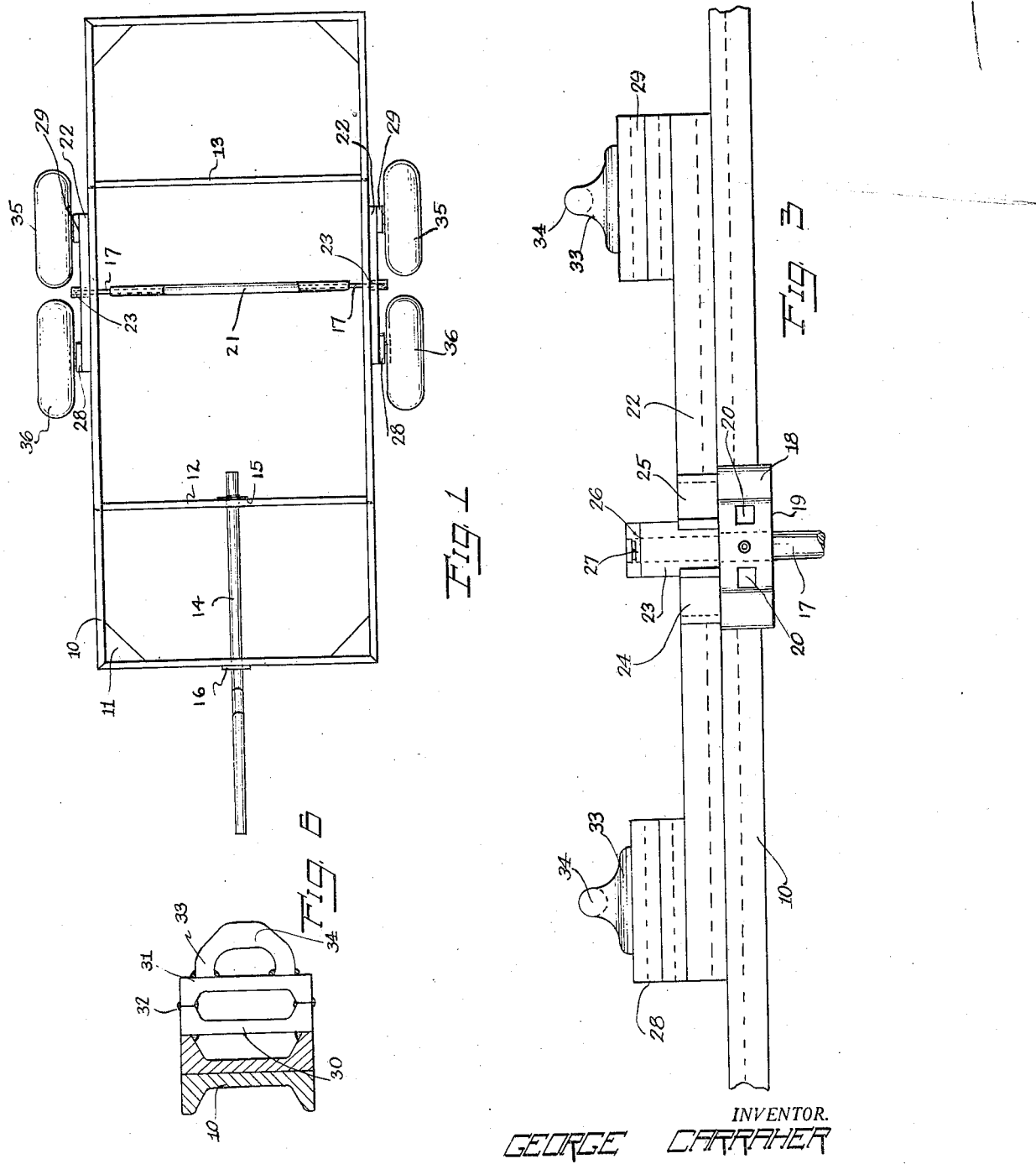

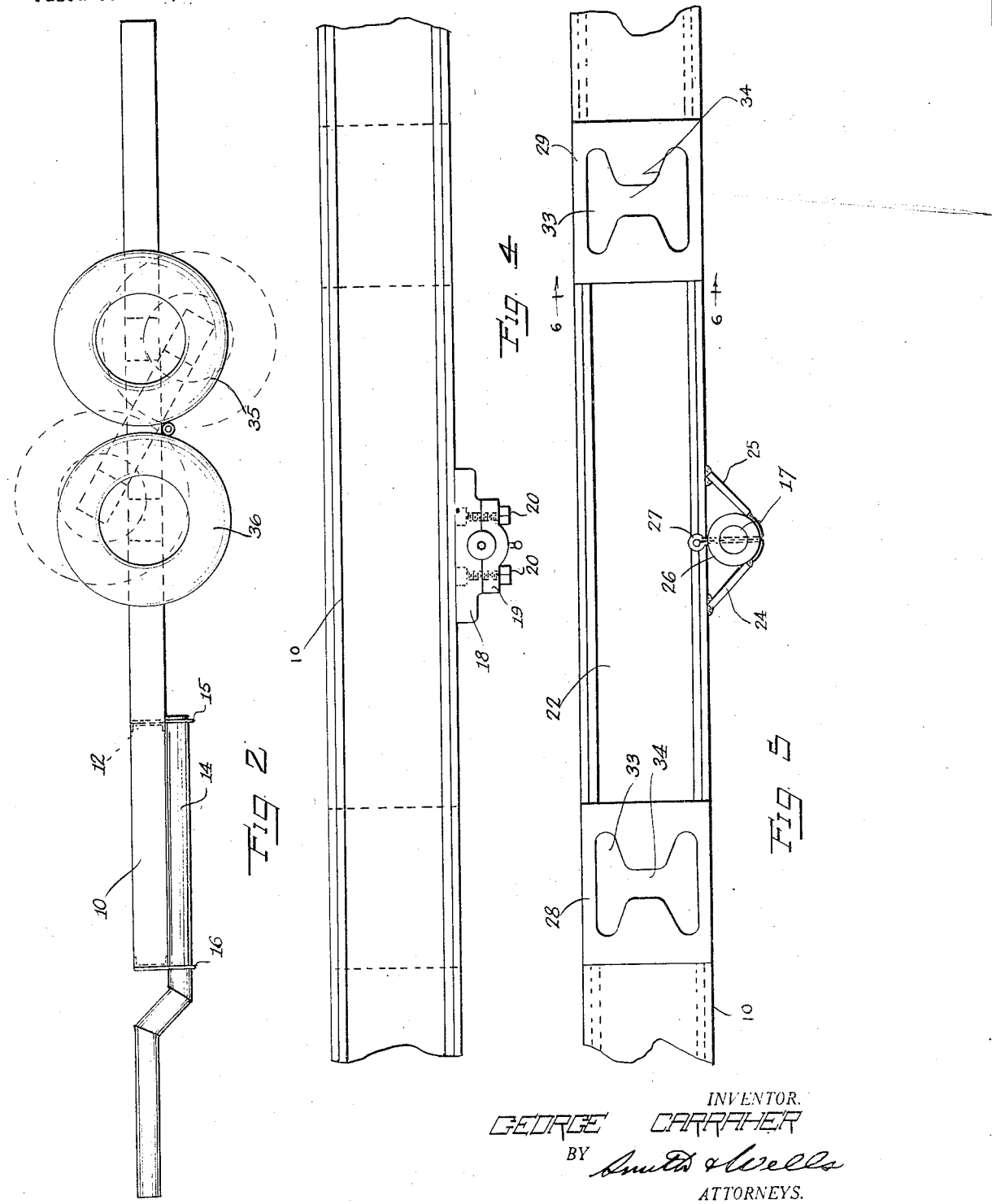

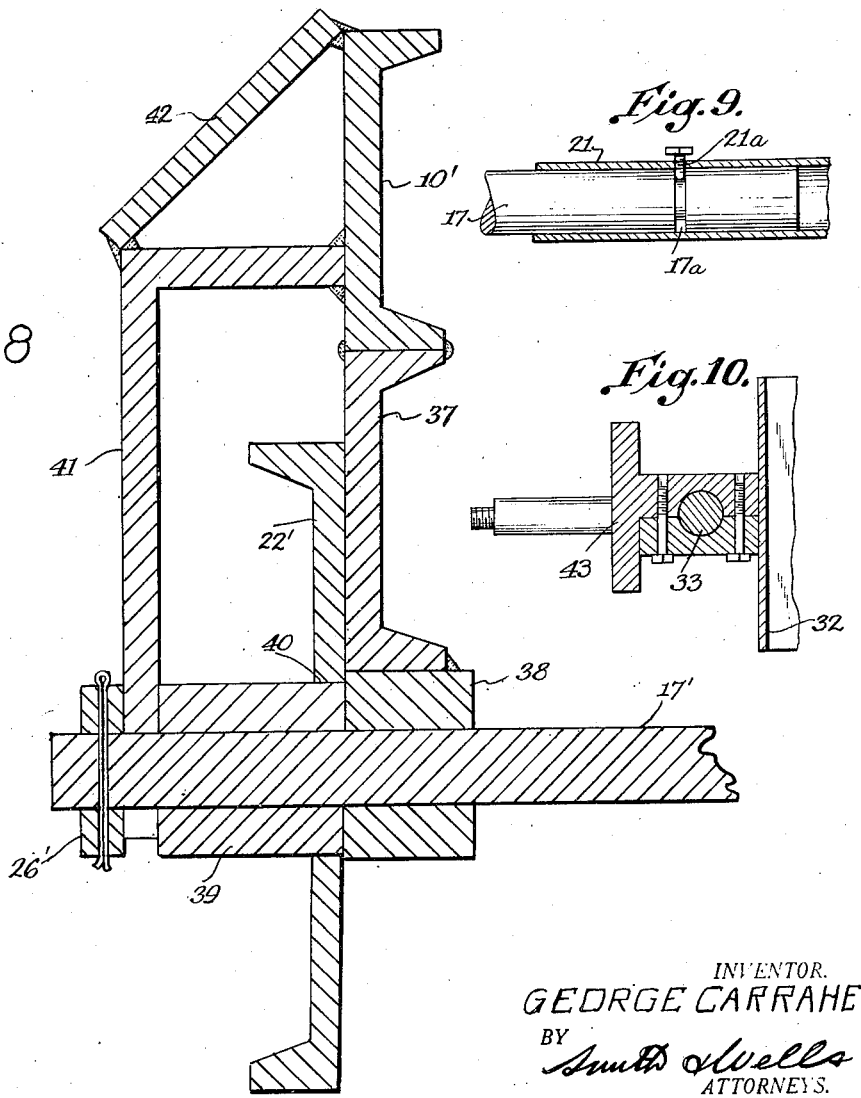

2,488,002

UNITED STATES PATENT OFFICE 2,488,002

TRAILER FRAME AND WHEEL MOUNTING THEREFOR

George Carraher, Wenatchee, Wash., assignor of one-half to Lawrence Leahy, Wenatchee, Wash.

Application October 17, 1945, Serial No. 622,809

2 Claims. (Cl. 280—104.5)

My invention relates to improvements in orchard trailer.

The principal purpose of the invention is to provide an improved trailer construction for use in orchards and similar areas of such a nature that the loading platform of the trailer can be placed quite low, yet the supporting wheels of the trailer consisting of pairs of wheels in tandem can be given unlimited movement circumferentially of the frame supporting axle so that the trailer can be operated in exceptionally rough ground without difficulty.

My invention is illustrated in connection with a trailer frame which is adapted to be hitched to a tractor and pulled about the orchard for loading fruit boxes and removing them from the orchard. In many orchards very difficult ground conditions are encountered due to ditches or other uneven ground levels. It is important in the loading of the trailer to have the loading platform at all times supported fairly close to the ground. It is also important to have the frame supported by wheels in such a manner that it is possible to get good support at a plurality of spaced points lengthwise of the frame. It sometimes occurs that one wheel of a tandem pair will rest on a hummock or a high ridge while the other wheel of the pair is in a low spot. The line connecting the supports of the two wheels may be at an angle of more than 30 degrees to the horizontal. According to my invention I provide wheeled supports to the truck frame which can be rotated with respect to the truck frame thus giving unlimited movement of the wheels in a vertical plane so that they may adapt themselves to any rough ground conditions encountered.

The novel features of my invention are set forth with particularity in the appended claims. The invention itself, however, both as to its organization and its operation, together with additional objects and advantages thereof, will best be understood from the following description of a specific embodiment when read in connection with the accompanying drawings in which:

Figure 1 is a plan view of an orchard trailer embodying my invention;

Figure 2 is a view in side elevation of the trailer;

Figure 3 is a fragmentary plan view of the connections between the trailer frame and the supporting wheels;

Figure 4 is a fragmentary view in side elevation of the trailer frame showing the mounting of the axle thereon;

Figure 5 is a side view of the wheel mounting rocker arm and its associated spindle blocks as seen from outside the trailer frame;

Figure 6 is a sectional view taken on the line 6—6 of Figure 5;

Figure 7 is a fragmentary side view of a modification;

Figure 8 is an enlarged sectional view on line 8—8 of Figure 7.

Figure 9 is a detail view illustrating the manner of connecting the axles, and:

Figure 10 is a detail view illustrating the conventional wheel mounting used.

Referring now to the drawings and particularly to Figure 1 there is shown an orchard trailer, the main body of which comprises a rectangular framework 10 composed of steel channels. These channels are welded together at the corners and are braced by providing corner gussets 11. The frame is reinforced by transversely extending steel channels 12 and 13. The channel 12 together with one of the end channels serves to secure a draw bar 14 by mounting depending plates 15 and 16 to which the draw bar 14 is welded. The draw bar 14 extending forwardly from the front end of the trailer frame may be provided with any suitable attaching means for attaching it to a tractor. The trailer frame 10 is adapted to be covered by any suitable flooring such as plank so that fruit boxes and the like can be stacked thereon in the usual manner.

The support for the trailer comprises an axle 17 at each side of the frame. These axles 17 are mounted to the frame by bearing blocks 18 welded to the underside of the frame and bearing caps 19 which are bolted to the blocks 18 by suitable bolts 20. The axles are connected by a tube 21 into which they extend a substantial distance. The axles are rotatable in the bearing on the frame and in the tube 21 so that either axle may turn independently of the other. As shown in Figure 9, the axles 17 extend into the tube 21 and are held against endwise movement by any conventional means such as a groove 17a in the axle and a pin 21a set in the tube 21.

A rocker arm 22 is provided for each of the axles 17. The two rocker arms are alike so that a description of one will suffice for both. Each rocker arm has an axle sleeve 23 welded to its flange and the axle sleeve is further braced by welding two braces 24 and 25 to the under surfaces of the sleeve and to the rocker arm at a distance from the sleeve. The rocker arm is also made of a steel channel of the same size as the trailer frame. The sleeve 23 is secured on the axle by providing a lock ring 26 at the outer end of the axle 17 and fixing the lock ring in position by a cotter pin 27.

Each rocker arm carries two spindle blocks 28 and 29 at its opposite ends. These blocks are made up of separate channel shaped sections 30 and 31 which have their edge faces welded as indicated at 32 (see Figure 6). A wheel spindle 33 is welded to the spindle block and has a cylindrical section 34 to which the wheel axle is attached. The wheel mounting is conventional. Figure 10 illustrates how the wheel axle 43 is clamped to the spindle 33.

The construction just described provides two wheels 35 and 36 in tandem on each rocker arm. The rocker arms are free to rotate throughout a complete revolution about the axle 17. Thus the wheels can shift from the full line position shown in Figure 2 to such a position as the dotted line position shown in Figure 2.

The construction provides an additional feature in that the trailer frame can be carried at two different levels by the same tandem wheels. If for example, the rocker arm is rotated 180 degrees about the axle 17 it will be beneath the axle 17 instead of over it as shown in Figure 2. The net result will be to raise the frame an amount equal to the distance from the axle to the top of the rocker arm 22. This feature of the invention may also be realized on sloping ground to raise one side of the trailer frame to a higher level than the other.

The principal feature of the invention however, lies in the fact that the rocker arms are so mounted as to enable the wheels to adjust themselves to great variations in ground level at any time, thus one pair of tandem wheels may have the front wheel on a hummock and the rear wheel in the ditch while exactly the opposite condition exists with respect to the other pair of tandem wheels. In all conditions the direction of pull on the frame will be at an advantageous angle with respect to the surfaces on which the pair of wheels rests.

In Figures 7 and 8 there is shown a modified form of the invention wherein the trailer frame 10' has a supporting channel 37 welded to its lower flange. A heavy bushing 38 is flattened at the top and welded to the lower flange of the channel 37. The axle 17' extends through this bushing and through a sleeve 39 that is set into an aperture 40 in the rocker arm 22' and welded in place. A support brace 41 is L-shaped in cross section. The short leg of the brace is welded to the frame 10' and the long leg of the brace extends down to the axle at the outer end of the sleeve 39. The brace is bifurcated at its lower end to fit over the axle 17'. A tie plate 42 is welded to the brace and the frame to give the brace additional strength. This modified form uses the same lock ring 26' for securing the axle as the main form of the invention. The axles 17' are extended into the tube 21 in the same manner as in the main form of the invention. The rocker arm however cannot rotate in this form of the invention since the brace 41 is in the way.

Having thus described my invention, I claim:

1. A trailer for use in orchards and the like comprising a framework having oppositely disposed steel channels forming side frame members, an axle bearing welded to the under side of each frame member, an axle rotatable in each bearing, tubular means receiving the inner ends of said axles and connecting them together, a steel channel rocker arm positioned against the outside of each of said bearings and side frame member and having an axle sleeve welded thereto and abutting the bearing, and wheels mounting the opposite ends of said rocker arms.

2. A trailer and wheel mounting therefor comprising steel channel side frames and cross frame members, an axle bearing secured on each side frame, two wheel supported rocker arms, each having two supporting wheels rotatably mounted thereon at the ends thereof, axles centrally mounted on each arm and extending into said bearings, and a tube extending across the space between the side frames and receiving the ends of said axles inwardly of the side frames.

GEORGE CARRAHER.

REFERENCES CITED

The following references are of record in the file of this patent:

UNITED STATES PATENTS

| Number | Name | Date |
|--------|------|------|
| 87,055 | Lunsford | Feb. 16, 1869 |
| 1,926,334 | Gurton | Sept. 12, 1933 |
| 2,260,574 | Martin | Oct. 28, 1941 |